Patented Apr. 18, 1933

1,904,440

UNITED STATES PATENT OFFICE

GEORGE H. FREYERMUTH, OF ELIZABETH, NEW JERSEY, AND WILLIAM V. HANKS, OF BATON ROUGE, LOUISIANA, ASSIGNORS TO STANDARD OIL DEVELOPMENT COMPANY, A CORPORATION OF DELAWARE

REACTIVATION OF CATALYST USED IN THE PREPARATION OF HYDROGEN

No Drawing. Application filed March 6, 1930. Serial No. 433,805.

The present invention relates to an improved process for producing hydrogen from hydrocarbon gases by reaction with steam at high temperatures. The invention will be fully understood from the following description and relates particularly to a method for reactivating the catalyst used in the process.

In the operation of the process, natural gas, refinery gas or the like which is to be fed to the apparatus, is first purified of the major portion of sulphur containing compounds by scrubbing with any suitable sulphur removing agent, such as caustic soda. The gas then flows to the first conversion stage of the process where, after preheating, it is passed through a plurality of tubes mounted in a furnace. The tubes are packed with a suitable catalyst which may consist of nickel or nickel oxide, cobalt or its oxides, with the addition of other metals or oxides, such as manganese or aluminum. Steam which has been preheated is passed into the tubes and reacts with the gas to produce hydrogen and carbon monoxide. The steam is used in an amount generally 100 or 120 percent in excess of that required to theoretically convert all the incoming carbon to carbon monoxide. The temperature in this stage of the conversion is maintained between 1400 and 2000° F. The outflowing mixture from the tubes passes to the second conversion chamber consisting of large diameter pipes preferably arranged in the same furnace but in a zone of lower temperature. The pipes are filled with a catalyst, generally iron oxide, or the like and are maintained at a temperature of 800 to 900° F. The carbon monoxide in the entering mixture is converted to carbon dioxide and additional hydrogen. Steam, preferably preheated, may be added to this stage of the process. The material is then cooled, and the steam condensed out, for example, by passage through a hydraulic main, after which it consists substantially of carbon dioxide and hydrogen. The carbon dioxide is removed by any convenient means, for example, by absorption with water under about 5 to 20 atmospheres pressure, the carbon dioxide being expelled from the water by release of pressure. Chemical solutions such as sodium carbonate solution may also be used. The final gas consists substantially of hydrogen and contains less than 3 to 5 percent of carbon dioxide, carbon monoxide, and unconverted hydrocarbon gas. The process may be operated under atmospheric pressure, or pressures of about 5 to 20 atmospheres may be employed.

In the production of hydrogen by the described method, it is found that the activity of the catalyst used in the first conversion stage to promote the reaction of hydrocarbon gas and steam to form hydrogen and carbon monoxide is decreased over long periods of time by deposition of carbon on the catalytic surface. This is shown by less complete conversion of hydrocarbon gas to hydrogen and carbon monoxide, so that 3 to 5 percent or more of methane is found in the final gas. In a co-pending application, Serial No. 434,036 filed March 7, 1930 by Freyermuth, Hanks and Small, it was shown that this carbon might be removed by passing steam alone through the coked tubes at a temperature between 1400 and 2000° F. for a period of 5 to 24 hours depending on the amount of carbon deposited on the catalyst. By this means the activity of the catalyst is increased so that it may again be used effectively in the conversion of hydrocarbons to hydrogen. We have now found that the catalyst may be further reactivated and brought back substantially to its original or initial activity by an additional step. By this means the coked catalyst is thoroughly steamed as in the above application, but instead of returning the catalyst to conversion service following this, it is treated with hydrogen or gas containing at least 60 percent of hydrogen for a period of 2 to 12 hours. The temperature is held above 1200° F. preferably in the range between 1400 and 1800° F. In this way the activity of the catalyst is materially increased over that obtained by steaming alone as shown by more complete conversion of hydrocarbons to hydrogen and carbon monoxide. An additional advantage is that the hydrogen treatment lessens the tendency of the catalyst to deposit carbon in subsequent operation.

Our invention is not to be limited by any theory of the mechanism of the reactions nor to any specific example which may have been given for purpose of illustration, but only by the following claims in which we wish to claim all novelty inherent in our invention.

We claim:

1. In a process for reactivation of a catalyst used in the manufacture of hydrogen by reaction of hydrocarbon gas and steam, the improvement comprising passing steam and hydrogen over the spent catalyst at an elevated temperature.

2. Process according to claim 1 in which the revivification is accomplished at a temperature of at least 1200° F.

3. Process according to claim 1 for reactivation of a catalyst containing a metal of the iron group at temperatures between about 1200 and 1800° F.

4. A process for reactivation of a catalyst used in manufacture of hydrogen from hydrocarbons by reaction with steam which comprises subjecting the spent catalyst first to the action of superheated steam for a prolonged period and then to the action of a gas rich in free hydrogen at high temperature for a prolonged period.

5. Process according to claim 4 in which the steam and hydrogen treatments are carried out at temperatures of at least 1200° F. for periods in excess of 5 and 2 hours respectively.

6. Process according to claim 1 for reactivation of a catalyst containing nickel at temperatures between about 1200 and 1800° F.

7. Process according to claim 1 for reactivation of a catalyst containing nickel and aluminum oxide at temperatures between about 1200 and 1800° F.

GEO. H. FREYERMUTH.
WILLIAM V. HANKS.